March 17, 1925.

R. SUCZEK

Re. 16,025

AUXILIARY APPARATUS FOR CONDENSERS

Original Filed May 9, 1917

INVENTOR.

BY Robert Suczek
Cornelius L. Ebert
his ATTORNEY.

Reissued Mar. 17, 1925.

Re. 16,025

UNITED STATES PATENT OFFICE.

ROBERT SUCZEK, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA.

AUXILIARY APPARATUS FOR CONDENSERS.

Original No. 1,342,471, dated June 8, 1920, Serial No. 167,389, filed May 9, 1917. Application for reissue filed April 6, 1922. Serial No. 550,186.

*To all whom it may concern:*

Be it known that I, ROBERT SUCZEK, now a citizen of the United States, residing in the city of Philadelphia, county of Philadelphia, and State of Pennsylvania, have invented certain new and useful Improvements in Auxiliary Apparatus for Condensers, of which the following is a specification.

My invention relates to apparatus for removing condensate or air, or both, from a condenser.

My invention resides in apparatus for removing condensate from a condenser comprising an ejector submerged in the condensate for delivering the condensate against a higher pressure.

My invention resides also in apparatus comprising in addition to the condensate removing ejector an air removing ejector which delivers into the condensate removing ejector.

My invention resides also in ejector condensate removing apparatus provided with automatic means for controlling the supply of motive fluid to the ejector in response to changes in amount of condensate.

And my invention resides in other features in combination with ejector condensate removing apparatus.

For an illustration of several examples of apparatus embodying my invention, reference is to be had to the accompanying drawing, in which.

Figure 1:
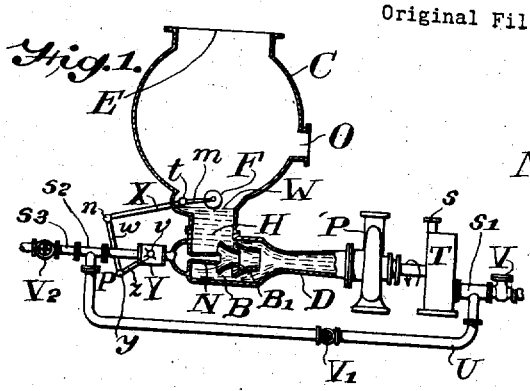
Figure 1 is a vertical sectional view, some parts in elevation, through a condenser and associated condensate removing means.

Referring to Fig. 1, C represents the shell of a condenser, for example, the shell of a surface condenser having the inlet E for the steam to be condensed and the opening O through which the air may be removed by any suitable apparatus for maintaining within the condenser C the desired degree of vacuum. The steam entering at E is condensed in well known manner into water, which is the condensate which collects in the bottom of the shell C and in the hot well or other receptacle H. Disposed within the hot well H is the nozzle N of ejector apparatus comprising in addition the diffuser guides or mixing cones B and B′ disposed in alinement with the combining tube or diffuser D which in turn delivers directly, or indirectly through any suitable length of pipe, into the centrifugal or other type of pump P driven by the steam turbine T or any other suitable motor, as an electric motor. When the motor T is a steam turbine it receives steam through the pipe $s$ and exhausts it through the pipe $s^1$ controlled by the valve V. Branched from the exhaust pipe $s^1$ is the pipe U controlled by valve $V^1$ and communicating with the pipe $s^2$ communicating with the nozzle N and controlled by the valve Y. Communicating with the pipe $s^2$ is another pipe $s^3$ connected with any suitable source of motive fluid, as live steam, and controlled by the valve $V^2$. Upon the upper surface W of the condensate collected in the bottom of the condenser C and hot well H is the float F carried on the end of the lever $m$ secured upon the pivotal shaft $t$ which extends through a vacuum tight joint to the exterior of the condenser shell C where there is secured thereto the link X pivoted at $n$ to the link $w$ pivoted at $y$ to the link $z$ whose other end is secured upon the pivotal shaft $v$ upon which is secured the valve Y.

With the valve $V^1$ closed and the valves V and $V^2$ open, the steam turbine T drives the pump P and pumps condensate from the hot well H and discharges the same against atmospheric or any other pressure, the exhaust steam from the turbine T passing through the pipe $s^1$ and through the valve V to atmosphere, or to a condenser, feed water heater or any other suitable point. Simultaneously live steam admitted through the valve $V^2$ and pipes $s^3$, $s^2$ passes the open valve Y to the nozzle N and in expanding causes to be drawn into the members B, B' and into the diffuser D the condensate in the hot well H, delivering the same at higher pressure to the pump P, thus causing the pump P to operate with an effective submergence greater than that due to the height of water level W in the absence of the ejector.

Or with the valves $V^2$ and V closed and the valve $V^1$ open, the ejector nozzle N is supplied with exhaust steam from the turbine T, in which case the action is similar to that above described.

Or when using exhaust steam as described live steam may also be used by partially opening the valve $V^2$ and thereby throttling the live steam to a pressure substantially the same as that of the exhaust steam. Or exhaust steam from any other source than the turbine T may be employed; for example, the exhaust steam from the turbine or engine driving the pump which supplies the cooling water to the condenser.

The motive fluid delivered to the nozzle N is controlled by the float F. In case the water level W falls, the float F descends and through the system of levers described moves the valve Y toward closed position, thereby shutting off more or less completely the supply of motive fluid to the nozzle N, with the result that the ejector removes or assists in removing less condensate, thereby causing the level to again rise to maintain proper submergence of the ejector. And in case the water level W falls sufficiently, the valve Y will be completely closed until the water level rises sufficiently, in which case the float F will again open the valve Y.

Figure 2:
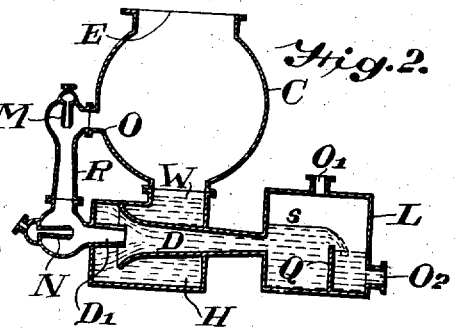
Fig. 2 is a vertical sectional view through a condenser and associated apparatus for removing air and condensate therefrom.

Referring to Fig. 2, the air opening O is shown as communicating with an ejector having the nozzle M to which steam or other suitable motive fluid is supplied, thereby drawing air from within the condenser C and compressing it, the motive fluid and entrained air being delivered to the second ejector whose nozzle is N supplied with suitable motive fluid, as steam, which entrains the motive fluid and air from the first ejector and delivers the same through the discharge nozzle $D^1$ which acts as an ejector motive fluid nozzle terminating within the hot well H in front of the diffuser D open at its end and submerged within the condensate in the well H and delivering into the chamber L having the weir partition Q, the air outlet $O^1$ and the condensate outlet $O^2$.

The first ejector whose nozzle is M withdraws air from the condenser C and compresses it, delivering the same into the second ejector whose nozzle is N, which then delivers the air and motive fluid through the nozzle $D^1$ into the diffuser D, further increasing the pressure of the air, and drawing into the diffuser D condensate from the hot well H and delivering both air and condensate at atmospheric pressure or any other suitable pressure above or below atmospheric into the chamber L, where the air separates from the condensate and passes out through the opening $O^1$, while the condensate overflows the weir partition Q and is drawn off by pump or otherwise through the outlet $O^2$.

Figure 3:
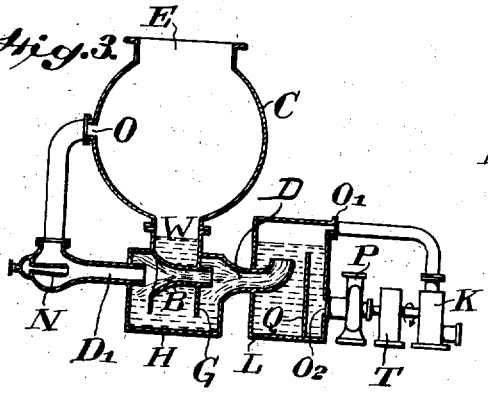
Fig. 3 is a vertical sectional view, some parts in elevation, through a condenser and associated air and condensate removing apparatus of modified form.

In Fig. 3 the air outlet O connects with the ejector whose nozzle is N which withdraws air from the condenser C and raises its pressure and delivers the same and the motive fluid through the discharge nozzle $D^1$, which terminates within the hot well H in front of the guide tube or cone B which is submerged in the condensate. The tube B extends horizontally through the downwardly extending wall or partition structure in the form of tube G, open at its lower end and connecting at its upper end with the condensate outlet of the condenser C. This causes the condensate to flow downwardly through the tube G before entering the hot well H, and thereby forms a trap or seal to prevent air delivered by the ejector from rising directly back into the condenser, which would result in again lowering the vacuum and in effect rendering the ejector useless so far as air removal is concerned. The outlet of the tube B is disposed in front of the diffuser tube D whose outlet end is upwardly turned and terminates within the air separating chamber L, whose air outlet $O^1$ connects with the air pump K and whose condensate outlet $O^2$ communicates with the suction of the condensate pump P, both pumps K and P being driven by any suitable motor, as the steam turbine T.

In this case the ejector withdraws air from the condenser C and compresses it to a pressure at least as great as that corresponding with the submergence of the discharge nozzle $D^1$ below the water level W. In issuing from the tube $D^1$, which acts as a motive fluid nozzle for the submerged ejector, the steam of the mixture is condensed, thereby producing a vacuum, which causes condensate to be drawn into the tube B, and due to the momentum of the condensate so attained it is delivered by the tube B to the tube D with sufficient velocity to cause it to issue from the tube D within the chamber L at a still higher pressure. This pressure generally being below atmospheric pressure, an air pump K increases the pressure of the air separated in the chamber L to atmospheric pressure or any other suitable pressure, and the pump P simultaneously removes the condensate to any suitable higher pressure, as atmospheric pressure.

Figure 4:
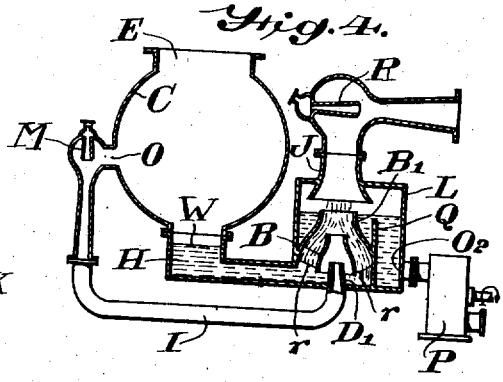
Fig. 4 is a vertical sectional view, some parts in elevation, through a condenser and associated air and condensate removing apparatus in conjunction with additional means for raising the air to higher pressure.

In Fig. 4 the air outlet O of the condenser communicates with the ejector whose nozzle is M, the ejector delivering through the tube I to the discharge nozzle $D^1$ of a second ejector terminating and pointing upwardly within the air separating chamber L. Disposed in vertical alinement above the nozzle $D^1$, which acts as the motive fluid nozzle for the submerged ejector, are the cones or guide tubes B and B′, the former supported by webs or ribs *r* upon the tube B′, which in turn is supported by any suitable means, as upon the wall of the chamber L and the weir partition Q. The condensate outlet $O^2$ communicates with the pump P driven by any suitable motor.

Vertically alined with the tube B′ is the funnel J having its receiving orifice within the chamber L and delivering to an ejector whose nozzle is R supplied with steam or other motive fluid from any suitable source.

In this case the ejector whose nozzle is M withdraws air from the condenser C and raises its pressure, the mixture of motive fluid and air being discharged by the nozzle $D^1$ into the condensate, which condenses the steam, producing a vacuum which assists the jet issuing from the nozzle $D^1$ to draw condensate into and upwardly through the tubes B and B′, delivering the condensate over the top edge of the tube B′ into one compartment of the chamber L from which it overflows the weir partition Q into the second compartment, from which it is withdrawn by the pump P. The air separates from the condensate and passes out through the funnel J to the ejector whose nozzle is R, which further raises the pressure of the air to atmospheric pressure or any other desired pressure.

It will be understood that the weir partition Q may be omitted, and the top edge of the tube B′ may constitute a weir over which the condensate flows to the outlet orifice $O^2$.

Figure 5:
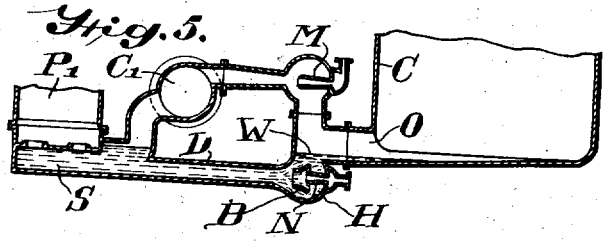
Fig. 5 is a vertical sectional view through a portion of a condenser and associated apparatus for removing air and condensate.

In Fig 5 C represents the bottom portion of a condenser shell, such, for example, as used on board ship. Both air and condensate are withdrawn through the outlet O, the condensate collecting in the hot well or other receptacle H within which is submerged an ejector whose nozzle is N, which receives steam or other suitable motive fluid. The nozzle N is alined with the guide ring B, which in turn is alined with the diffuser D communicating with the suction chamber S of the pump $P^1$. The air passing out from the condenser through the opening O passes upwardly to the ejector whose nozzle M is supplied by steam or any other suitable fluid. This ejector raises the pressure of the air and delivers it together with the motive fluid into the condenser $C^1$ in which the motive fluid is more or less completely condensed, the condensate passing onwardly to the suction chamber S, as does also the air, the condensate and air being removed from the suction chamber S by the pump $P^1$, which may be any suitable type of pump, but preferably a reciprocating wet air pump. The ejector whose nozzle is N imparts pressure and velocity to the condensate and delivers the same at higher pressure to the suction chamber S in assistance to the pump $P^1$.

Figure 6:
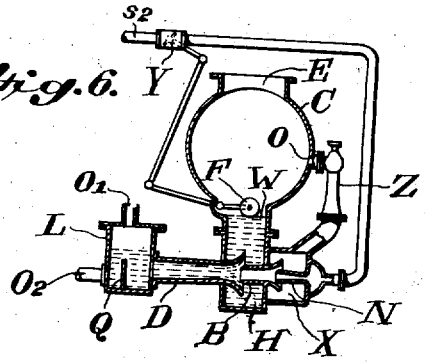
Fig. 6 is a vertical sectional view, some parts in elevation, through a condenser and associated means for removing air and condensate with automatic control responsive to changes in condensate level.

In Fig. 6 the float F, responsive to changes in level of the condensate in the hot well H, controls the valve Y which controls the supply of steam or other motive fluid delivered by pipe $s^2$ to the ejector whose nozzle is N disposed within a chamber X through whose wall extends the guide tube or cone B into a hot well H in alinement with the diffuser tube D whose inlet is within the hot well H and which discharges into the air separating chamber L having the air outlet $O^1$ and the condensate outlet $O^2$. The air outlet O of the condenser communicates with a steam or other ejector Z, which withdraws air from the condenser and raises it in pressure and delivers it at higher pressure into the chamber X. From the chamber X the motive fluid and air from the ejector Z is drawn by steam issuing from the nozzle N through the tube B, which acts as a motive fluid nozzle of the submerged ejector, into the hot well H, where condensation of the steam takes place, producing a vacuum which assists the jet from the tube B in drawing condensate into and forcing it through the diffuser D and delivering the same at still higher pressure into the air separating chamber L.

As the level W of the condensate falls, the float F falls and moves the valve Y toward closed position, thereby reducing the amount of steam supplied to the nozzle N, and thereby causing the motive fluid issuing therefrom to remove less condensate from the chamber H. In case the level W falls far enough, the valve Y will be completely closed. And as the level of the condensate rises again due to accumulation of condensate, the float F will rise and open the valve Y to proper degree.

In both Figs. 1 and 6 the float F may control the action of the ejector in any suitable way as by adjusting an adjustable diffuser or adjustable nozzle, or both.

While the ejectors herein disclosed are of simple single nozzle types, it will be understood that any suitable forms of ejector may be used, as for example, those employing a plurality of steam nozzles, or ejectors having annular nozzles and diffusers, or ejectors of the latter type in which the diffuser is disposed outside of and surrounds the annular nozzle which discharges radially into the diffuser.

What I claim is:

1. The combination with a condenser, of a condensate receptacle, an ejector submerged in the condensate and in communication with said receptacle for removing the condensate therefrom to a region of higher pressure, and an ejector for removing air from said condenser delivering into said first named ejector.

2. The combination with a condenser, of a condensate receptacle, an ejector submerged in the condensate and in communication with said receptacle for removing the same therefrom to a region of higher pressure, an ejector for removing air from said condenser delivering into said first named ejector, and means receiving air removed with the condensate by said first named ejector and raising the same to higher pressure.

3. The combination with a condenser, of a condensate receptacle, ejector apparatus for removing air from said condenser and condensate from said receptacle, a closed chamber into which the air and condensate are delivered, a pump for removing condensate from said chamber, and means for removing the separated air from said chamber and delivering it to a region of higher pressure.

4. The combination with a condenser, of three ejectors, the first ejector withdrawing air from the condenser and delivering it at higher pressure to the second ejector, a condensate receptacle, said second ejector removing condensate from said receptacle and delivering the same and the air from the first ejector to higher pressure, and the third ejector further raising the pressure of the air.

5. The combination with a condenser, of ejector apparatus removing air and condensate therefrom, a closed chamber receiving said air and condensate, the condensate and air separating from each other in said chamber, and means receiving air from said chamber and raising it to higher pressure.

6. The combination with a condenser, of ejector apparatus removing air and condensate therefrom, a closed chamber receiving said air and condensate, the condensate and air separating from each other in said chamber, and an ejector receiving air from said chamber and raising it to higher pressure.

7. The combination with a condenser, of ejector apparatus removing air and condensate therefrom, a closed chamber receiving said air and condensate, the condensate and air separating from each other in said chamber, means receiving air from said chamber and raising it to higher pressure, and a pump for removing condensate from said chamber.

8. The combination with a condenser, of ejector structure for removing condensate therefrom, an ejector for removing air from said condenser delivering into said ejector structure, a closed chamber receiving the air and condensate, and means for removing the air from said chamber and raising it to higher pressure.

9. The combination with a condenser, of ejector structure for removing condensate therefrom, an ejector for removing air from said condenser delivering into said ejector structure, a closed chamber receiving the air and condensate, means for removing the air from said chamber and raising it to higher pressure, and means for separately removing the condensate from said chamber.

10. The combination with a condenser, of nozzle structure removing air and condensate therefrom, the air and condensate outlets from said condenser being independent of each other, a closed chamber receiving the air and condensate, and means for removing air from said chamber and raising it to higher pressure.

11. The combination with a condenser, of nozzle structure removing air and condensate therefrom, the air and condensate outlets from said condenser being independent of each other, a closed chamber receiving the air and condensate, means for removing air from said chamber and raising it to higher pressure, and means for separately removing condensate from said chamber.

12. The combination with a condenser, of a receptacle for the condensate therefrom, an ejector operated by elastic motive fluid submerged in the condensate for removing said condensate from said receptacle to a region of higher pressure, a second ejector removing air from said condenser, and means for removing the condensate and air delivered by said ejectors and delivering them at higher pressure.

13. The combination with a condenser and its hot well in direct and open communication with said condenser, of an ejector operated by elastic fluid submerged in the condensate in said well for removing said condensate from said hot well to a region of higher pressure, a second ejector removing air from said condenser and discharging to said ejector, and means for delivering the discharges from said ejectors to higher pressure.

14. The combination with a condenser, of a closed chamber within which the pressure is intermediate the pressure within said condenser and atmospheric pressure, ejector apparatus removing air and condensate from said condenser and discharging into said chamber, the condensate and air separating from each other in said chamber, and means removing the air from said chamber and further raising its pressure.

15. The combination with a condenser, of a closed chamber within which the pressure is intermediate the pressure within said condenser and atmospheric pressure, ejector apparatus removing air and condensate from said condenser and discharging into said chamber, the condensate and air separating from each other in said chamber, and an ejector withdrawing air from said chamber and raising it to higher pressure.

16. The combination with a condenser, of a receptacle for the condensate therefrom, an ejector for removing condensate from said receptacle, and means withdrawing air from said condenser and delivering it at higher pressure to the nozzle structure of said ejector.

17. The combination with a condenser, of a receptacle for the condensate therefrom, an ejector for removing condensate from said receptacle, and a second ejector whose discharge is delivered to the nozzle structure of said first named ejector.

18. The combination with a condenser, of a receptacle for the condensate therefrom, an ejector for removing condensate from said receptacle, and a steam-operated ejector withdrawing air from said condenser, the mixture of motive fluid and air discharged by said second ejector constituting motive fluid for said first named ejector.

19. The combination with a receptacle containing liquid, of a second closed receptacle, and an ejector submerged in said liquid and delivering it at higher pressure to said second receptacle.

20. The combination with a receptacle containing liquid, of a second closed receptacle, and an ejector submerged in said liquid and operated by elastic motive fluid to deliver said liquid at higher pressure to said second receptacle.

21. The combination with a receptacle containing liquid, of a second closed receptacle, an ejector submerged in said liquid and delivering it at higher pressure to said second receptacle, and a pump removing said liquid from said second receptacle.

22. The combination with a receptacle containing liquid, of an ejector submerged in said liquid and removing it from said receptacle, and means for delivering to said ejector motive fluid comprising a mixture of vapor and gas.

23. The combination with a receptacle containing liquid, of an ejector submerged in said liquid and removing it from said receptacle, and a second ejector whose discharge is utilized as motive fluid for said first named ejector.

24. The combination with a receptacle containing liquid, of an ejector submerged in said liquid and removing it from said receptacle, and a second ejector discharging a mixture of vapor and gas utilized as motive fluid by said first named ejector.

25. The combination with a condenser, of a receptacle for the condensate therefrom, a chamber, and an ejector submerged in said condensate and delivering it at higher pressure to said chamber.

26. The combination with a condenser, of a receptacle for the condensate therefrom, a chamber, an ejector submerged in said condensate and delivering it at higher pressure to said chamber, and a pump removing said condensate from said chamber.

27. The combination with a condenser, of a receptacle for the condensate therefrom, an ejector removing the condensate from said receptacle, and a second ejector whose discharge is utilized as motive fluid in said first named ejector.

28. The combination with a condenser, of a receptacle for the condensate therefrom, a chamber, an ejector delivering said condensate from said receptacle into said chamber, and a second ejector discharging to said first named ejector.

29. The combination with a condenser, of a receptacle for the condensate therefrom, a chamber, an ejector delivering said condensate from said receptacle into said chamber, and a second ejector discharging gas to said first named ejector, the condensate and gas separating from each other in said chamber.

30. The combination with a condenser, of a receptacle for the condensate therefrom, a chamber, an ejector delivering said condensate from said receptacle into said chamber, a second ejector discharging gas to said first named ejector, the condensate and gas separating from each other in said chamber, and means for withdrawing the condensate from said chamber.

31. The combination with a condenser, of a receptacle for the condensate therefrom, a chamber, an ejector delivering said condensate from said receptacle into said chamber, a second ejector discharging gas to said first named ejector, the condensate and gas separating from each other in said chamber, and means for raising the pressure of the gas separated in said chamber.

In testimony whereof I have hereunto affixed my signature this 3d day of April, 1922.

ROBERT SUCZEK.